JULES FOUGERAT AND LUCIEN A. TARTIERÈ, OF QUOGUE, NEW YORK, ASSIGNORS TO "THE ALGA CHEMICAL WORKS," OF NEW YORK CITY.

Letters Patent No. 83,372, dated October 27, 1868.

IMPROVED PROCESS FOR THE MANUFACTURE OF IODINE.

The Schedule referred to in these Letters Patent and making part of the same.

*To all whom it may concern:*

Be it known that we, JULES FOUGERAT and LUCIEN A. TARTIERÈ, of Quogue, in the county of Suffolk, and State of New York, have invented a new and improved Process of Making Iodine; and we do hereby declare that the following is a full, clear, and exact description thereof, which will enable others skilled in the art to make and use the same.

This invention relates to certain improvements in the process for making iodine, for which Letters Patent, No. 78,078, were granted to JULES FOUGERAT on the 19th day of May, 1868.

And our present invention consists—

First, in filtering the calcinized mussels preparatory to the application of the sulphuric acid and other chemicals.

Second, in the application of peroxide of manganese to the ingredients, by which the iodine is produced.

The invention finally consists in the whole process of producing the iodine from mussels.

The process is as follows:

The mussels, whether alive, or their shells, are first washed, and then calcinized and pulverized. They are then put in a sufficient quantity of water, say from five to eight times their weight, and are then boiled for a few minutes. This mixture is then filtered, and is, after filtering, put into a retort, and treated therein with sulphuric acid and peroxide of manganese. This mixture is then distilled, and the iodine, which is the product of distillation, is drawn off into a suitable receptacle.

Having thus described our invention,

We claim as new, and desire to secure by Letters Patent—

1. Filtering the calcinized and boiled mussels, preparatory to their distillation, as set forth.

2. The application of peroxide of manganese to the making of iodine from mussels, as set forth.

3. The process herein specified of producing iodine from mussels.

J. FOUGERAT.
LUCIEN A. TARTIERÈ.

Witnesses:
F. BLOCKLEY,
ALEX. F. ROBERTS.